United States Patent [19]

Foss

[11] Patent Number: 5,610,369
[45] Date of Patent: Mar. 11, 1997

[54] CABLE SPLICE CLOSURE

[75] Inventor: Raymond C. Foss, Plymouth, United Kingdom

[73] Assignee: Bowthorpe PLC, United Kingdom

[21] Appl. No.: 433,389

[22] PCT Filed: Nov. 2, 1993

[86] PCT No.: PCT/GB93/02256

§ 371 Date: May 3, 1995

§ 102(e) Date: May 3, 1995

[87] PCT Pub. No.: WO94/10732

PCT Pub. Date: May 11, 1994

[30] Foreign Application Priority Data

Nov. 3, 1992 [GB] United Kingdom ............ 9223013

[51] Int. Cl.$^6$ ............ H02G 15/04; H02G 15/08
[52] U.S. Cl. ............ 174/84 R; 174/87; 174/91; 174/92
[58] Field of Search ............ 174/84 R, 77 R, 174/87, 91, 93, 92

[56] References Cited

U.S. PATENT DOCUMENTS

| | | | |
|---|---|---|---|
| 4,736,072 | 4/1988 | Hvidsten | 174/93 |
| 4,902,855 | 2/1990 | Smith | 174/77 R |

FOREIGN PATENT DOCUMENTS

| | | | |
|---|---|---|---|
| 0240295 | 7/1987 | European Pat. Off. . | |
| 0390746 | 10/1991 | European Pat. Off. . | |
| 0452383B1 | 12/1994 | European Pat. Off. | 174/91 |
| 3414693 | 1/1985 | Germany . | |
| 0760940 | 11/1956 | United Kingdom . | |
| 0908838 | 10/1962 | United Kingdom | 174/77 R |
| 1138337 | 1/1969 | United Kingdom | 174/77 R |
| 2148613 | 5/1985 | United Kingdom | 174/77 R |
| 2188747 | 10/1987 | United Kingdom . | |
| 2240436 | 7/1991 | United Kingdom | 174/77 R |

*Primary Examiner*—Kristine L. Kincaid
*Assistant Examiner*—Chau N. Nguyen
*Attorney, Agent, or Firm*—David P. Gordon

[57] ABSTRACT

A cable splicing closure includes a base having ports for the entry of cables to be spliced, and a tubular cover for sliding axially over a peripheral surface of the base. The surface is formed with a groove which tapers towards the end from which the cover is applied and which carries an O-ring seal that is engaged by the cover and which rolls along the tapering surface of the groove as the cover is slid onto the base. The O-ring seal is rolled substantially more than 50 percent, but less than 100 percent, of its peripheral length when it is rolled into its final sealed position. Thus, the O-ring will exert a force in a direction urging the tubular cover more firmly onto the base.

7 Claims, 3 Drawing Sheets

CABLE SPLICE CLOSURE

BACKGROUND OF THE INVENTION

This invention relates to a cable splice closure, particularly for communications cables (including optical fibre cables).

Typically a closure for cable splices comprises a base having ports for the entry of the cables, and a tubular cover which is closed at one end and arranged to fit at its other end around the periphery of the base, the cover when fitted enclosing splices which have been made between the cables. It is necessary to form a seal between the base and the end of the cover and typically a clamping arrangement is used.

SUMMARY OF THE INVENTION

We have now devised a cable splice closure which includes a simple but effective seal between the cover and base.

In accordance with this invention there is provided a cable splice closure which comprises a base having ports for the entry of cables to be spliced, and a tubular cover for sliding axially over a peripheral surface of the base, said surface tapering towards the end from which the cover is applied and carrying an O-ring seal which is engaged by the cover and rolled along said tapering surface as the cover is slid onto the base.

Thus, as the tubular cover is slid onto the base, the O-ring seal is rolled into a position where it is more firmly gripped between the cover and the base, and so seals effectively.

A quantity of sealing composition e.g. grease may be applied to the tapering surface. This may be applied either in the field immediately before the cover is slid onto the base, or in the factory (in which case it is provided with a temporary protection, e.g. a length of tape wound around the base to cover the grease).

In one embodiment the tubular cover is closed at one end by an end wall. The end wall of the cover is preferably formed with a projection for mounting the closure to a support rail.

In an alternative embodiment the tubular cover is open at its opposite ends, so that the cover may be applied to bases at its opposite ends. The bases may be interconnected so that the tubular cover can be applied axially from one end of the interconnected bases, each base thus has its peripheral surface tapering towards the end from which the cover is applied.

Also in accordance with this invention there is provided a base for a cable splice closure, the base comprising ports for the entry of cables to be spliced, and a peripheral surface over which a tubular cover member is to be axially slid, said surface tapering towards the end from which the cover is to be applied and carrying an O-ring seal arranged to be engaged by the cover and rolled along said tapering surface as the cover is slid onto the base.

Embodiments of this invention will now be described by way of examples only and with reference to the accompanying drawings.

DETAILED DESCRIPTION OF THE PREFERRED EMBODIMENTS

Figure 1:
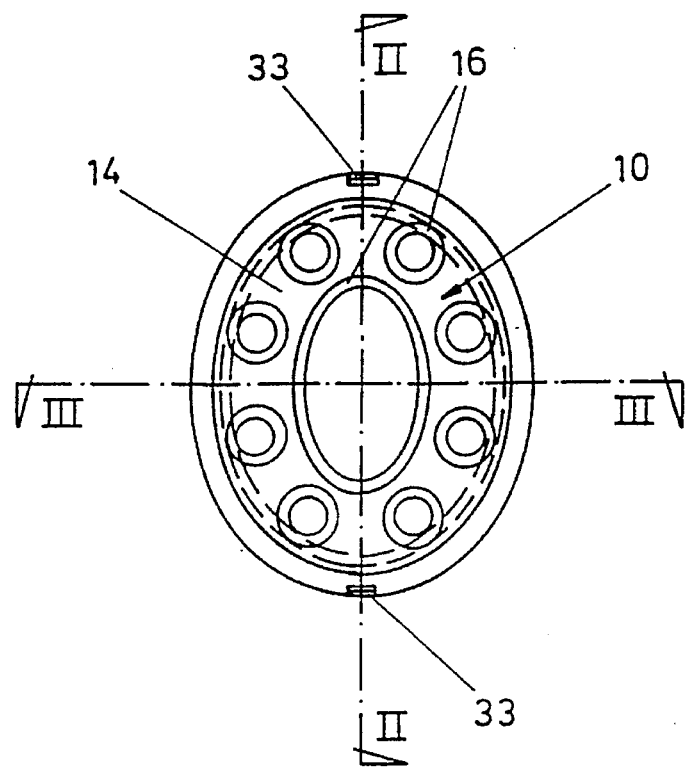
FIG. 1 is an end view of an embodiment of cable splice closure in accordance with this invention.

Referring to FIGS. to 1 to 3 of the drawings, there is shown an embodiment of cable splice closure which comprises a base 10 and a tubular cover 30, each of plastics material. The base 10 comprises a tubular portion 12 and an end wall 14, with a plurality of tubular projections e.g. 16 extending outwards from its end wall 14 and forming cable entry ports. The tubular portion 12 has a peripheral surface 18 formed with a groove 20, an edge of the groove being formed by a ring 22 applied to the end of the tubular portion 12 of the base. The peripheral surface of the tubular portion 12, within the groove 20, tapers inwardly in the axial direction towards the ring 22 and carries an O-ring 24. The tubular cover 30 is closed at one end and its other end is dimensioned as a sliding fit over the outside of the tubular portion 12.

Figure 4:
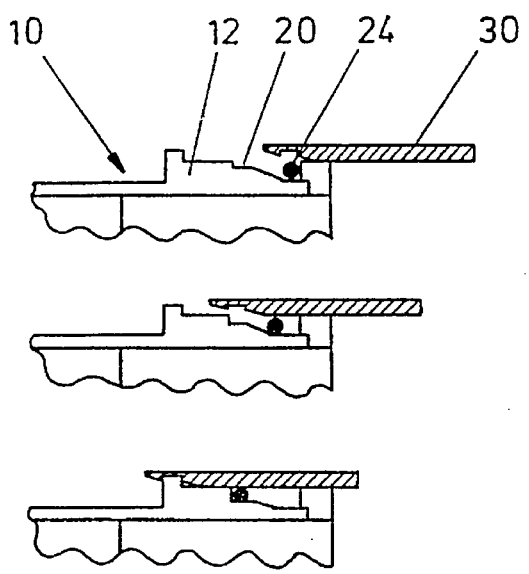
FIG. 4 comprises sectional views to illustrate diagrammatically the manner in which an O-ring of the closure is displaced as a tubular cover is slid onto the closure base.
Figure 2:
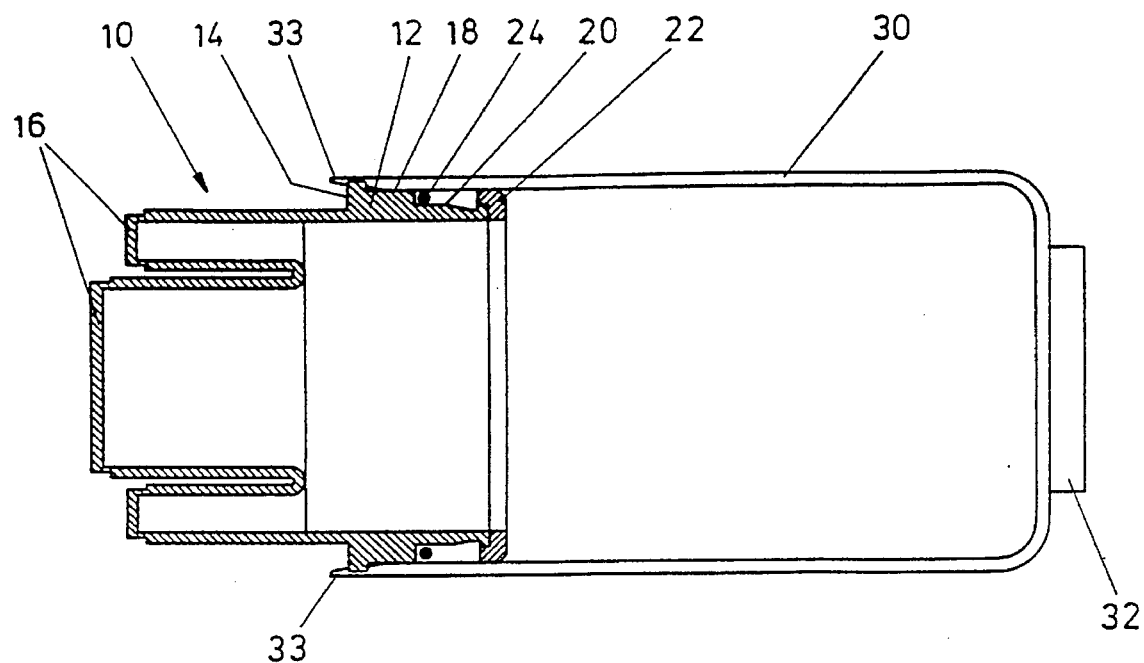
FIG. 2 is a longitudinal section through the cable splice closure, on the line II—II shown in FIG. 1.
Figure 3:
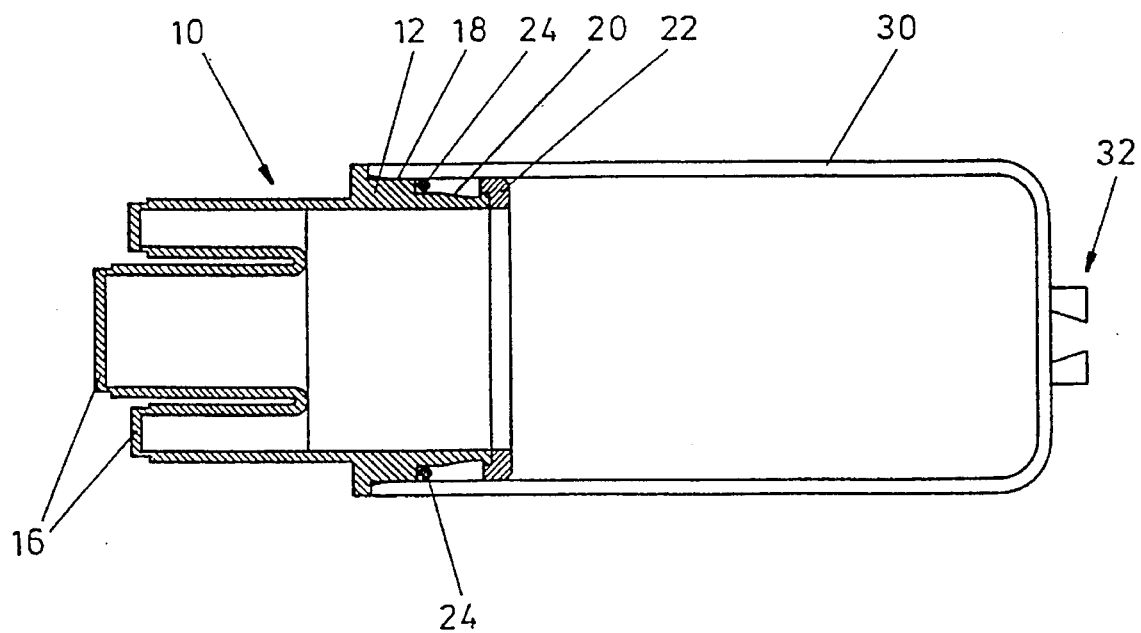
FIG. 3 is a longitudinal section through the cable splice closure, on the line III—III shown in FIG. 1.

As shown in FIG. 4, as the tubular cover 30 is slid over the tubular portion 12 of the base, its inner surface engages the O-ring 24 and causes the latter to roll along the tapering surface of the groove 20, from the smaller-diameter side to the larger-diameter side of the groove. Thus, the O-ring 24 is compressed and therefore becomes more firmly gripped between the inner surface of the cover 30 and the outer periphery of the base 10, to form an effective seal. The rolling of the O-ring imparts a twisting action to it, and if at its final position the O-ring has been rolled substantially more than. 50% (say 75%) of its peripheral length, then it has a natural tendency to roll the remaining amount forward to its original configuration: accordingly, the O-ring, in its final position, exerts a twisting force in a direction urging the tubular cover onto the base.

Catches may be provided to lock the cover onto the base: in the example shown, the cover has two longitudinally projecting flexible catches 33 which snap engage over the end wall 14 of the base 10.

The groove 20 may be filled or partially filled with grease to improve the seal. The grease may be applied in the field, immediately prior to sliding the cover 30 onto the base: alternatively the grease may be applied in the factory, in which case it is preferably protected by a length of tape would around the base over the groove 20.

As shown, the outer end of the cover 30 may be formed with a projection 32 defining a groove: this is for mounting the closure to a support rail, but also a suitable tool can be engaged into the groove for pulling the cover from the base 10.

Figure 5:
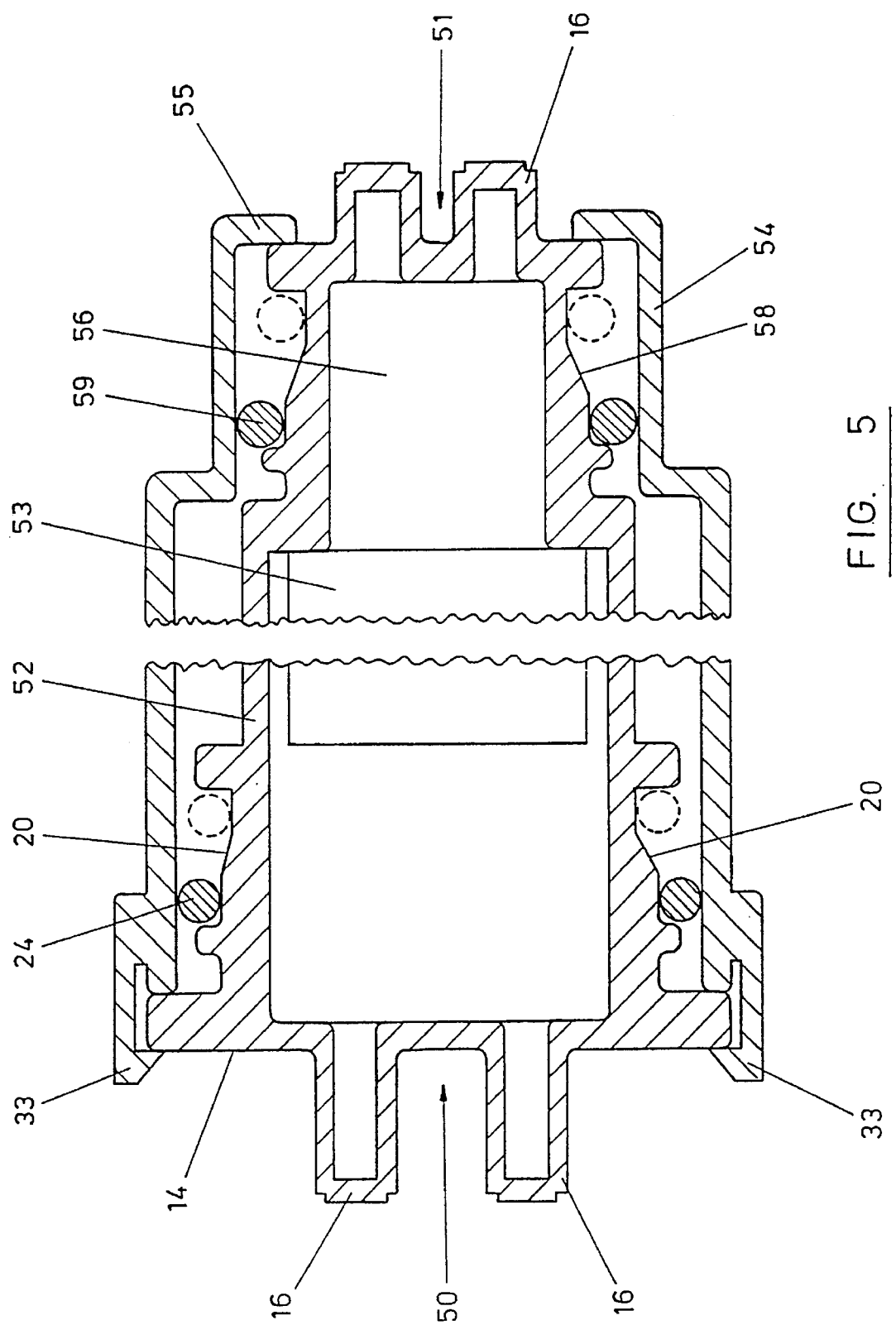
FIG. 5 is a sectional view through an alternative embodiment of cable splice closure.

Referring to FIG. 5, there is shown an alternative embodiment of cable splice closure which comprises two bases 50,51 mounted at opposite open ends of a tubular cover 54. The bases 50,51 are interconnected by two or more webs 52 which define openings 53 that allow access into the region 56 between the two bases. The base 50 is similar in construction to the base 10 shown in FIGS. 1–4, and like parts are given like reference numerals. The cover 54 is stepped in diameter and an inwardly projecting annular flange 55 is formed at its reduced diameter end to seal against the base

51. The closure is sealed by inserting the interconnected bases 50,51, into the cover 54 from its enlarged diameter end. The peripheral surface of the grooves 20,58 in the two bases 50,51 both taper inwardly towards the end from which the cover 54 is applied, so that their respective O-ring seals 24,59 are compressed against the inner surface of the cover 54 to form an effective seal at both ends.

In use, the closure shown in FIG. 5 may be connected in series with a cable, so that interconnections may be made to the cable. The cover 54 may be pulled back over the cable in order to gain access to the interconnections inside the closure.

I claim:

1. A cable splice closure for cables to be spliced, comprising:
    a) a first base member having ports receiving the cables to be spliced, and a peripheral surface tapering toward an end of said first base member;
    b) an O-ring adapted to be located in a final position on said tapered peripheral surface, and having a peripheral length; and
    c) a tubular cover means for sliding axially over said tapered peripheral surface, for engaging said O-ring, and for rolling said O-ring along said tapered peripheral surface,
    wherein said cable splice closure is arranged to permit said O-ring to be rolled by said tubular cover means from a non-stressed orientation over said peripheral surface by substantially more than 50%, but less than 100%, of said peripheral length to said final position, such that said O-ring has a natural tendency to rotate forward to said non-stressed orientation, and such that said O-ring exerts a twisting force in a direction urging said tubular cover means onto said first base member.

2. A cable splice closure according to claim 1, further comprising: d) a quantity of sealing composition applied to said tapering peripheral surface.

3. A cable splice closure according to claim 1, further comprising:
    a second base members substantially similar to said first base member, wherein said tubular cover means is provided with two open opposite ends, arranged for sliding axially over respective peripheral surfaces of said first and second base members.

4. A cable splice closure according to claim 3, wherein:
    said first and second base members are interconnected, said tubular cover means is arranged to be applied axially from an end of said interconnected base members, and said peripheral surfaces of said base members taper towards said end of said interconnected base members from which said tubular cover means is applied.

5. A cable splice closure according to claim 1, wherein:
    an outer edge of said tubular cover means is formed with a mounting projection for mounting said cable splice closure to a support rail.

6. A cable splice closure according to claim 1, wherein:
    wherein said cable splice closure is arranged so that said O-ring is rolled more than 60%, but less than 90%, of said peripheral length of said O-ring.

7. A cable splice closure according to claim 1, wherein:
    wherein said cable splice closure is arranged so that said O-ring is rolled approximately 75% of said peripheral length of said O-ring.

\* \* \* \* \*